United States Patent Office 2,843,602
Patented July 15, 1958

2,843,602

2,3-DI(CHLOROALKOXY)-p-DIOXANES

Nicholas B. Lorette, Lake Jackson, Tex., assignor to The Dow Chemical Company, Midland, Mich., a corporation of Delaware No Drawing. Application November 5, 1956
Serial No. 620,204

3 Claims. (Cl. 260—340.6)

The present invention is concerned with the 2,3-di(chloroalkoxy)-p-dioxanes having the formula

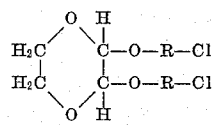

wherein R represents an alkylene radical containing from 3 to 4 carbon atoms, inclusive. These new compounds are liquids somewhat soluble in many organic solvents and of very low solubility in water. These compounds are particularly useful as herbicides and are adapted to be employed as active toxic constituents of compositions for the control of the growth and the killing of weeds and for the sterilization of soil with regard to the growth of plants.

The new dioxane compounds may be prepared by mixing or otherwise blending together a 2,3-dichloro-p-dioxane and a chloroalkanol having the formula, ClROH, wherein R is as previously defined at a reaction temperature at which chloride of reaction is formed from the chlorine of the 2,3-dichloro-p-dioxane reactant. This chloride appears in the reaction mixture as hydrogen chloride. The reaction conveniently may be carried out in an inert organic solvent such as toluene, benzene or carbon tetrachloride. Good results are obtained when one molecular proportion of 2,3-dichloro-p-dioxane is reacted with two or more molecular proportions of the chloroalkanol reagent. The reaction proceeds smoothly with the formation of the desired product and hydrogen chloride of reaction at temperatures of from 70° to 120° C. In carrying out the reaction, substantially all of the chlorine of the 2,3-dichloro-p-dioxane reactant may be recovered as hydrogen chloride. Upon completion of the reaction, as evidenced by the substantial cessation of the evolution of hydrogen chloride, the desired product may be separated by fractional distillation under reduced pressure.

The following examples illustrate the invention but are not to be construed as limiting:

*Example 1.—2,3-di(3-chloropropoxy)-p-dioxane*

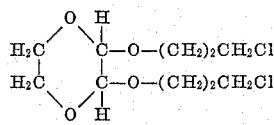

Four and fifty-five hundredths moles of 3-chloro-1-propanol was dispersed in 2 moles of 2,3-dichloro-p-dioxane dissolved in 500 milliliters of benzene and the resulting mixture heated at the boiling temperature and under reflux until about 2.0 moles of hydrogen chloride of reaction had been evolved. The heating was carried out at a temperature of 80° C. and over a period of 16 hours. Following the heating period, the reaction mixture was fractionally distilled under reduced pressure to obtain a 2,3-di(3-chloropropoxy)-p-dioxane product boiling at 151°–153° C. at 2–3 millimeters pressure. The latter had a refractive index n/D at 24° C. of 1.4718 and a specific gravity at 24°/4° C. of 1.322.

*Example 2.—2,3-di(4-chlorobutoxy)-p-dioxane*

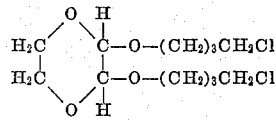

One and one-half moles of 2,3-dichloro-p-dioxane dissolved in 200 milliliters of benzene was admixed with 35 moles of 4-chloro-1-butanol and the resulting mixture heated at the boiling temperature and under reflux until about 2.0 moles of hydrogen chloride had been evolved. The heating was carried out at a temperature of 80° C. and over a period of 16 hours. Following the heating period, the reaction mixture was fractionally distilled under reduced pressure to obtain a 2,3-di(4-chlorobutoxy)-p-dioxane product boiling at 163°–165° C. at one millimeter pressure. The latter had a refractive index n/D at 24° C. of 1.4725 and a specific gravity at 25°/4° C. of 1.8881.

In a similar manner, other 2,3-di(chloroalkoxy)-p-dioxanes may be prepared as follows:

2,3-di(2-chloropropoxy)-p-dioxane by reacting together 2-chloro-1-propanol and 2,3-dichloro-p-dioxane.

2,3-di(1-chloro-2-propoxy)-p-dioxane by reacting together 1-chloro-2-propanol and 2,3-dichloro-p-dioxane.

2,3-di(2-chlorobutoxy)-p-dioxane by reacting together 2-chloro-1-butanol and 2,3-dichloro-p-dioxane.

2,3-di(1-chloro-2-methyl-2-propoxy)-p-dioxane by reacting together 1-chloro-2-methyl-2-propanol and 2,3-dichloro-p-dioxane.

2,3-di(2-chloro-2-methylpropoxy)-p-dioxane by reacting together 2-chloro-2-methyl-1-propanol and 2,3-dichloro-p-dioxane.

The new 2,3-di(chloroalkoxy)-p-dioxane products are effective as herbicides, i. e., for the killing of weeds. For such use the products may be dispersed on an inert finely divided solid and employed as dusts. Also, such mixtures may be dispersed in water with the aid of a wetting agent, and the resulting aqueous suspension employed as sprays. In other procedures, the products may be employed as constituents of oil-in-water emulsions or water dispersions with or without the addition of wetting, dispersing or emulsifying agents. In a representative operation, 2,3-di(4-chlorobutoxy)-p-dioxane gave a 100 percent control of the growth of the germinant seeds and emerging seedlings of Japanese millet when distributed in soil at a dosage of 50 pounds per acre.

In the present specification and claims, the term "alkylene" refers to an aliphatic hydrocarbon radical having its free valences on different carbon atoms such as

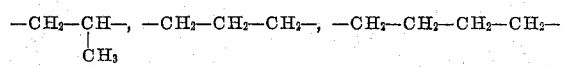

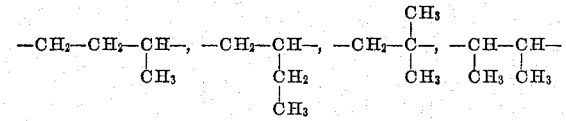

and

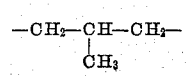

I claim:
1. A 2,3 - di(chloroalkoxy) - p - dioxane having the structure
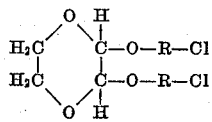
wherein R represents an alkylene radical containing from 3 to 4 carbon atoms, inclusive.
2. 2,3-di(3-chloropropoxy)-p-dioxane.
3. 2,3-di(4-chlorobutoxy)-p-dioxane.
References Cited in the file of this patent
UNITED STATES PATENTS
2,331,993    MacDowell et al. _____ Oct. 19, 1943